(No Model.)
A. E. CAMPBELL.
STEAM COOKING APPARATUS.
No. 244,180. Patented July 12, 1881.
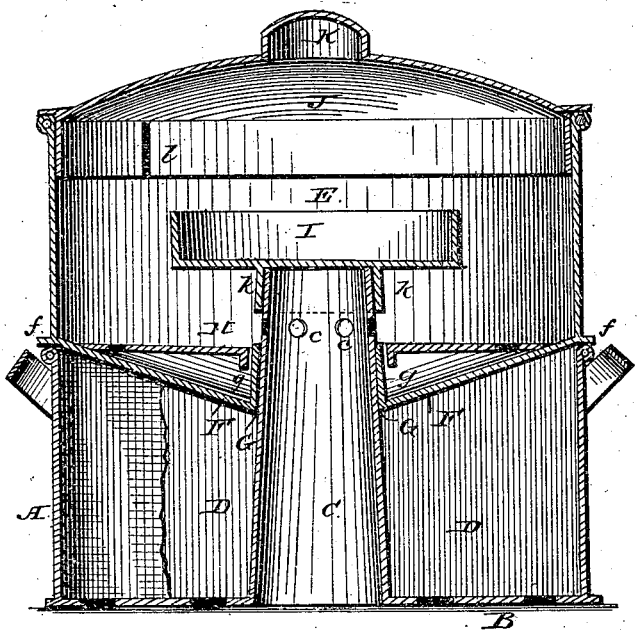
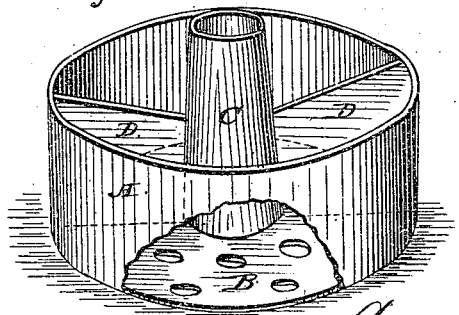
WITNESSES
Fred. G. Dieterich
A. H. Krause
INVENTOR,
Amanda E. Campbell
By her Attorneys, Louis Bagger & Co.

UNITED STATES PATENT OFFICE.

AMANDA E. CAMPBELL, OF BOULDER, COLORADO.

STEAM COOKING APPARATUS.

SPECIFICATION forming part of Letters Patent No. 244,180, dated July 12, 1881.

Application filed April 11, 1881. (No model.)

*To all whom it may concern:*

Be it known that I, AMANDA E. CAMPBELL, of Boulder, in the county of Boulder and State of Colorado, have invented certain new and useful Improvements in Steam Cooking Apparatus; and I do hereby declare that the following is a full, clear, and exact description of the invention, which will enable others skilled in the art to which it appertains to make and use the same, reference being had to the accompanying drawings, which form a part of this specification, and in which—

Figure 1 is a vertical section; and Fig. 2 is a perspective view of the bottom compartment with its dividing-diaphragms.

Similar letters of reference indicate corresponding parts in both the figures.

My invention has relation to steam cooking apparatus, or so called "domestic steamers;" and it consists in the improved construction and combination of parts, as hereinafter described, and particularly pointed out in the claims.

In the accompanying drawings, A represents a cylindrical vessel having a perforated bottom, B, which fits over the boiler. (Not shown in the drawings.) Any kind of boiler or steam-generator of the requisite size may be used. The vessel A, which forms the lowermost compartment of the apparatus, has a central conical tube, C, having a series of perforations, c, at its upper end, and is divided by the radial diaphragms D D into two compartments, as shown more clearly in Fig. 2 of the drawings.

E is the upper vessel, which has an inclined bottom, F, forming an annular flange, f, that rests upon the rim of the lower vessel, A. The inclined bottom F has a central aperture, G, made with an annular flange or collar, g, for the insertion of tube C when both the vessels A E are in use for cooking. The upper vessel, E, is provided with a false bottom, H, which has a central aperture for the insertion of tube C, and is perforated to allow the water formed by the condensation of the steam in the upper chamber to drain down upon the inclined bottom F, the flange or collar G of which will prevent it (the water) from running down into the bottom vessel A.

I is a pudding-bowl, which consists simply of a sheet-metal (or earthenware) pan, having a rim, i, and socket k, which fits upon the top of the steam-tube C.

J is the cover, the rim l of which is split vertically at points diagonally opposite to each other to permit it to be inserted upon the lower vessel or compartment, A, when this is used alone, and the partitions D D of which would otherwise be in the way. These partitions are made with upper inclined edges to make room for the conical bottom of the upper vessel, E, when this is placed upon A. The cover J is made with a central raised part or cap, K, for the insertion of the top of the steam-tube C when the cover is used with vessel E. This cap also serves as a handle for the cover.

The operation of this apparatus will readily be understood from the foregoing description, taken in connection with the drawings.

From the boiler or steam-generator, which is placed over one of the stove-holes, the steam enters the lower vessel, A, through its perforated bottom, and the upper vessel, E, through the perforated steam-tube C, at the same time heating the bottom of the pudding-bowl I, which covers the top of the tube. The perforated false bottom H keeps the contents of the upper vessel out of the water of condensation in the bottom of the pan, and the collar g prevents steam from entering the upper vessel, except through its legitimate channel—viz., the steam-tube C, so that the odor or flavor of the food cooked in one of the compartments will not intermingle with or affect that of the others.

Having thus described my invention, I claim and desire to secure by Letters Patent of the United States—

1. In a domestic steamer, the detachable pudding-bowl I, having socket k, in combination with the vessels A E, cover J, and steam-tube C, as set forth.

2. In a domestic boiler, the upper compartment, E, having inclined bottom F, provided with the central aperture, G, and collar g, and having perforated false bottom H, as and for the purpose herein shown and set forth.

3. The combination of vessel A, having perforated bottom B, partitions D D, and central conical steam-tube, C, upper vessel, E, having inclined bottom F, perforated centrally at G, and having collar g, false bottom H, pudding-bowl I, having downwardly-projecting socket k, and cover J, having central cap, K, all constructed and combined substantially as and for the purpose herein shown and specified.

In testimony that I claim the foregoing as my own I have hereto affixed my signature in presence of two witnesses.

AMANDA E. CAMPBELL.

Witnesses:
D. H. EMLEN,
R. M. BELL.